(12) United States Patent
Paskewitz

(10) Patent No.: US 11,148,239 B2
(45) Date of Patent: Oct. 19, 2021

(54) LUG NUT LOOSENING ASSEMBLY

(71) Applicant: Mark Paskewitz, Boise, ID (US)

(72) Inventor: Mark Paskewitz, Boise, ID (US)

( * ) Notice: Subject to any disclaimer, the term of this patent is extended or adjusted under 35 U.S.C. 154(b) by 28 days.

(21) Appl. No.: 16/777,225

(22) Filed: Jan. 30, 2020

(65) Prior Publication Data

US 2021/0237216 A1 Aug. 5, 2021

(51) Int. Cl.
*B23P 19/06* (2006.01)
*B60B 31/00* (2006.01)

(52) U.S. Cl.
CPC ............. *B23P 19/06* (2013.01); *B60B 31/00* (2013.01)

(58) Field of Classification Search
CPC .................................. B23P 19/06; B60B 31/00
See application file for complete search history.

(56) References Cited

U.S. PATENT DOCUMENTS

| | | | |
|---|---|---|---|
| 3,905,254 A * | 9/1975 | Palatnick | B60B 29/005 81/57.3 |
| 4,537,101 A * | 8/1985 | Eversole | B60B 29/003 81/180.1 |
| 4,972,742 A | 11/1990 | Brown | |
| 5,613,411 A | 3/1997 | Rines | |
| 6,748,832 B1 * | 6/2004 | Maxwell | B60B 29/003 81/121.1 |
| D578,362 S | 10/2008 | McCartney | |
| 8,286,535 B1 * | 10/2012 | McCartney | B25F 1/02 81/180.1 |
| 9,278,438 B2 * | 3/2016 | Robinson | B60B 29/001 |
| 10,065,454 B2 | 9/2018 | Coetzee | |
| 10,493,799 B2 * | 12/2019 | Hedley | B60B 29/001 |
| 10,800,207 B1 * | 10/2020 | Omidi | B60B 29/005 |
| 2016/0159146 A1 * | 6/2016 | Ramirez, Jr. | B60B 29/003 81/177.2 |
| 2017/0253080 A1 * | 9/2017 | Klien | B60B 29/003 |
| 2018/0170100 A1 * | 6/2018 | Hardison | B25B 23/00 |
| 2019/0308449 A1 * | 10/2019 | Bowden, Sr. | B25B 13/44 |
| 2020/0039304 A1 * | 2/2020 | Parks | B60C 25/0548 |

FOREIGN PATENT DOCUMENTS

WO WO2014087267 6/2014

* cited by examiner

*Primary Examiner* — Rick K Chang

(57) ABSTRACT

A lug nut loosening assembly includes a coupler that has a well therein for insertably receiving a free end of a lug wrench. The coupler has an axle aperture therein and an axle is insertable through the axle aperture. A pair of wheels is each of the wheels is positionable on the axle when the axle is inserted through the axle aperture wherein each of the wheels is configured to rest on a support surface upon which the vehicle is parked. each of the wheels rolling along the support surface when the vehicle is rolled rearwardly and when the lug wrench is positioned on the lug nut and is inserted into the sleeve wherein the pair of wheels is configured to transfer the rearward motion of the vehicle into counter-clockwise rotation of the lug wrench for breaking free the lug nut.

8 Claims, 5 Drawing Sheets

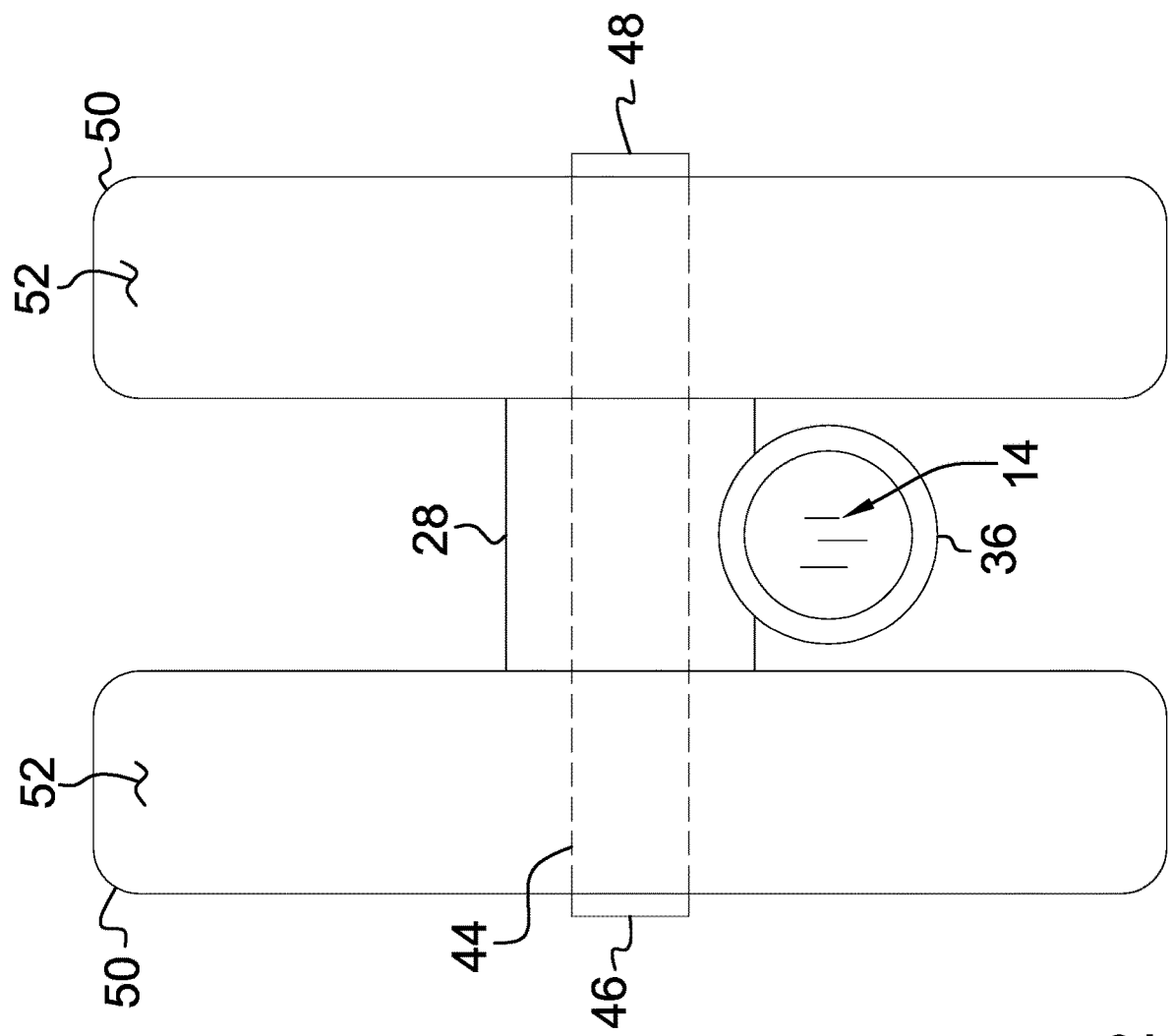

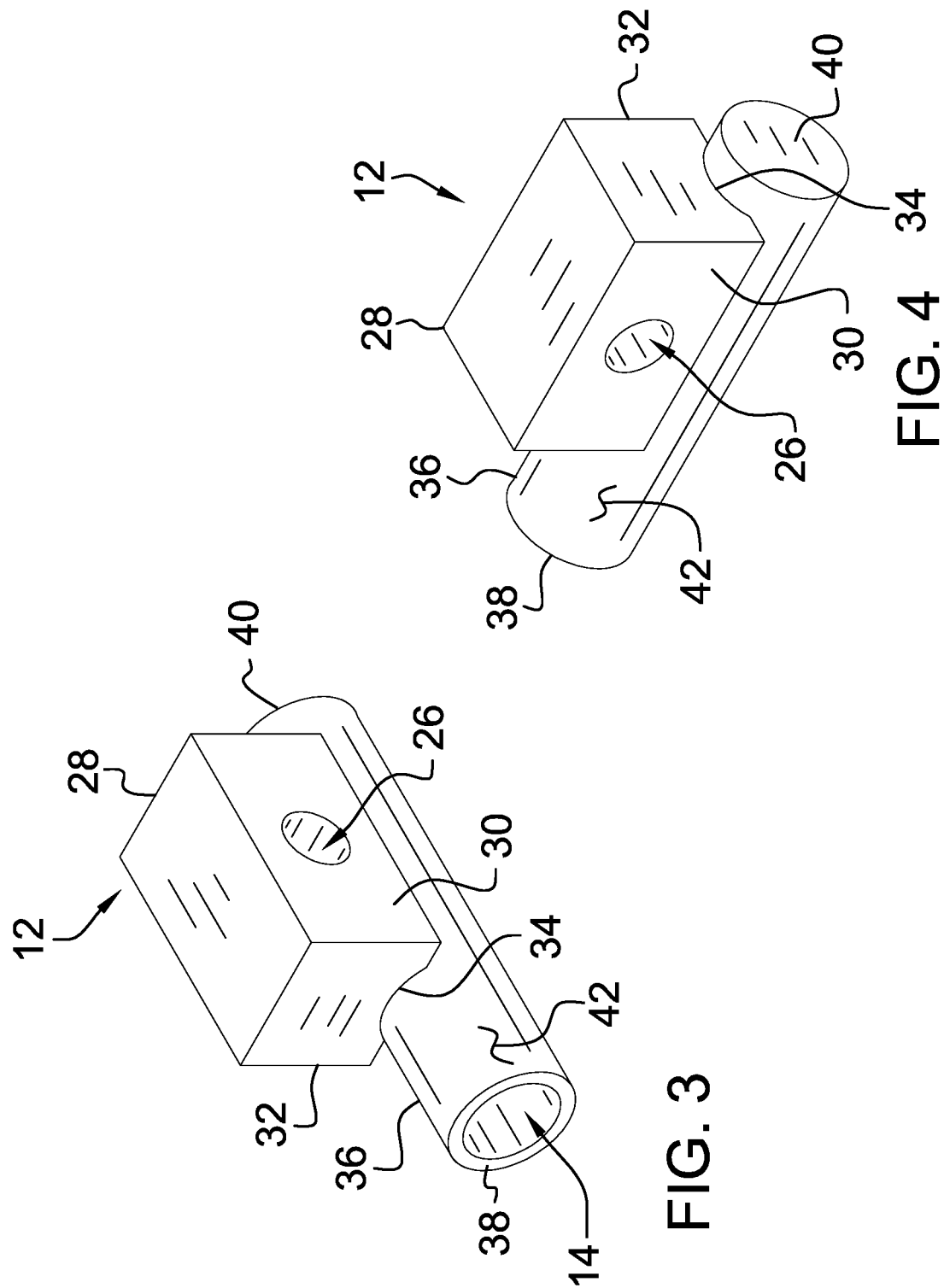

LUG NUT LOOSENING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to lug nut devices and more particularly pertains to a new lug nut device for harnessing motion of a vehicle to loosen lug nuts.

(2) Description of Related Art Including Information Disclosed Under 37 CFR 1.97 and 1.98.

The prior art relates to lug nut devices. The prior art discloses a variety of lug nut devices that includes a lever for stepping upon and a support for engaging a support surface. In this way a user can step on a lug wrench for loosening or tightening lug nuts. Additionally, the prior art discloses a lug wrench device that include a curved stand that adjusts the height of the lug wrench for engaging each of the lug nuts on a wheel. In no instance does the prior art disclose a device that harnesses motion of a vehicle for loosening or tightening lug nuts.

BRIEF SUMMARY OF THE INVENTION

An embodiment of the disclosure meets the needs presented above by generally comprising a coupler that has a well therein for insertably receiving a free end of a lug wrench when the lug wrench has been positioned on a lug nut of a wheel on a vehicle. The coupler has an axle aperture therein and an axle is insertable through the axle aperture. A pair of wheels is each of the wheels is positionable on the axle when the axle is inserted through the axle aperture wherein each of the wheels is configured to rest on a support surface upon which the vehicle is parked. each of the wheels rolling along the support surface when the vehicle is rolled rearwardly and when the lug wrench is positioned on the lug nut and is inserted into the sleeve wherein the pair of wheels is configured to transfer the rearward motion of the vehicle into counter-clockwise rotation of the lug wrench for breaking free the lug nut.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a back phantom view of an embodiment of the disclosure.

FIG. 3 is a top perspective view of a coupler of an embodiment of the disclosure.

FIG. 4 is a back perspective view of a coupler of an embodiment of the disclosure.

DETAILED DESCRIPTION OF THE INVENTION

Figure 1:
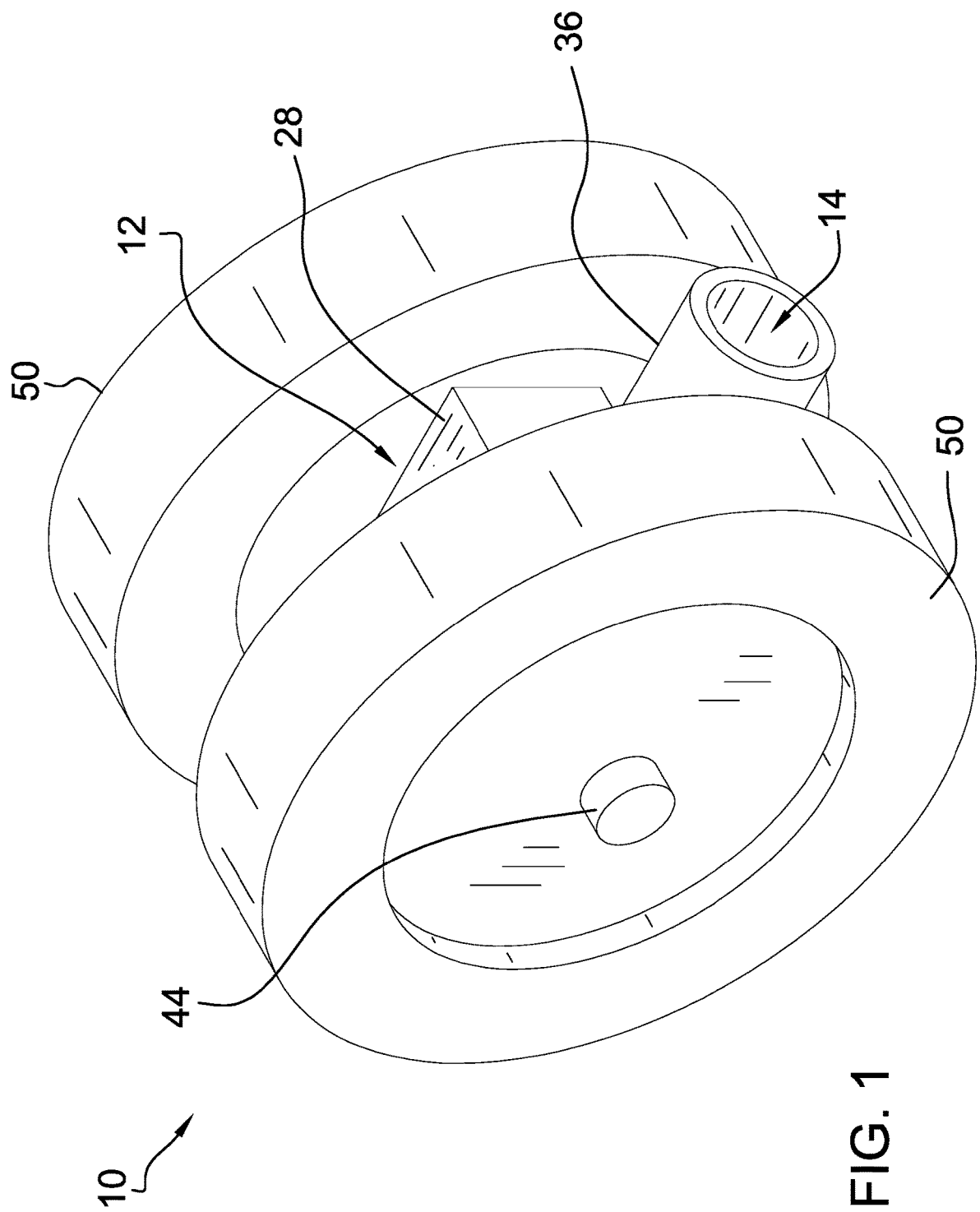
FIG. 1 is a perspective view of a lug nut loosening assembly according to an embodiment of the disclosure.
Figure 5:
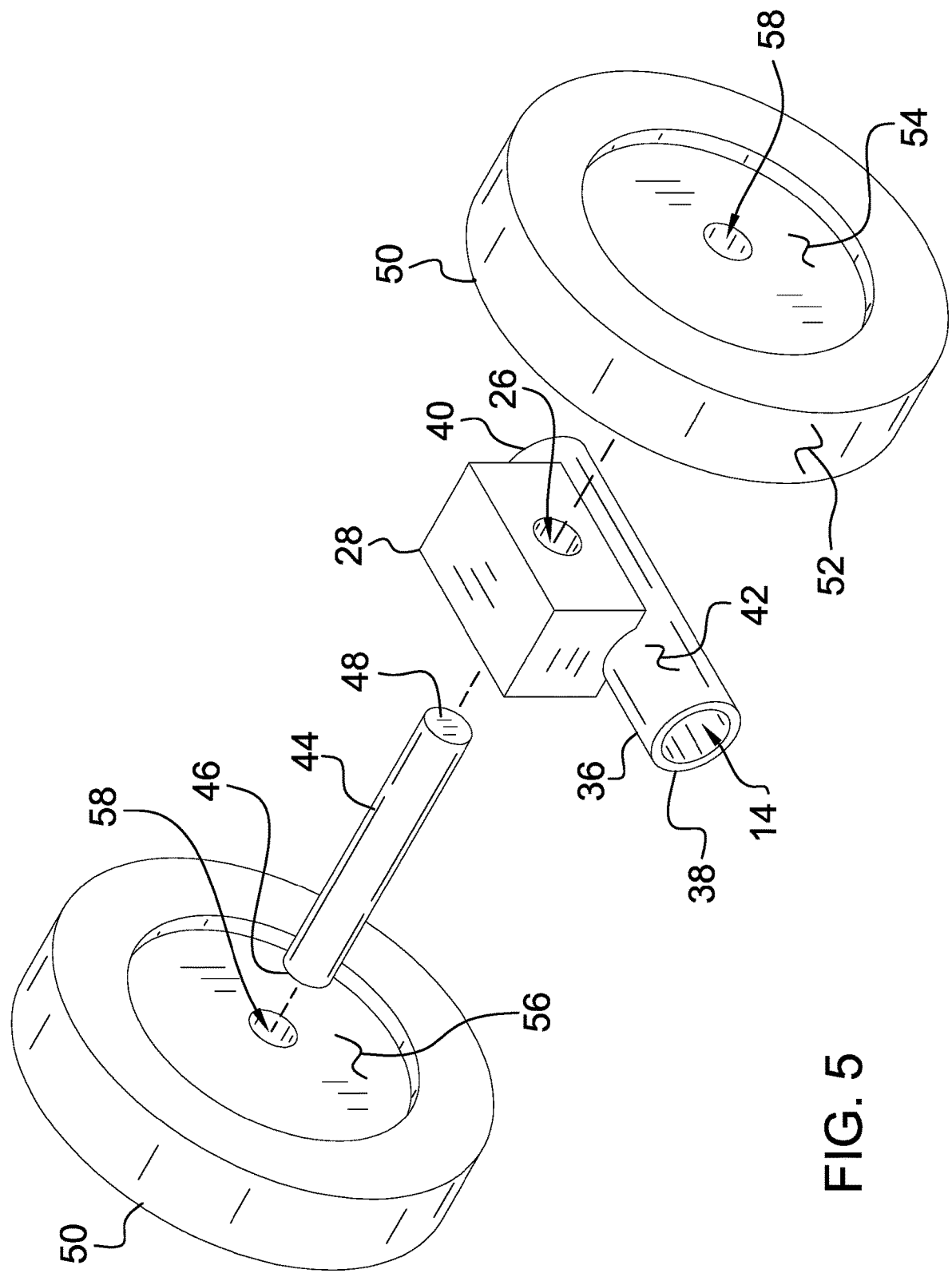
FIG. 5 is an exploded perspective view of an embodiment of the disclosure.
Figure 6:
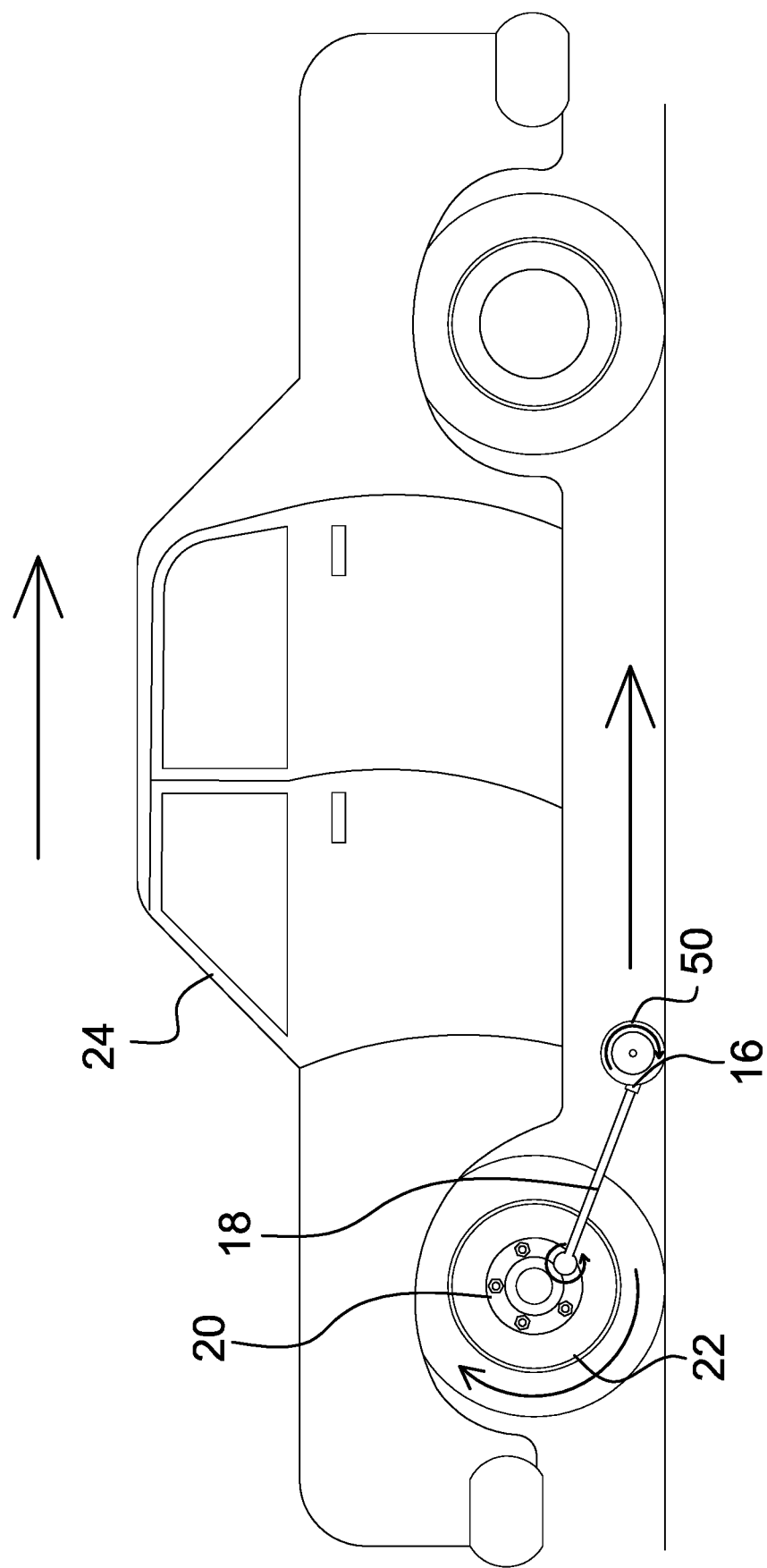
FIG. 6 is a perspective in-use view of an embodiment of the disclosure.

With reference now to the drawings, and in particular to FIGS. 1 through 6 thereof, a new lug nut device embodying the principles and concepts of an embodiment of the disclosure and generally designated by the reference numeral 10 will be described.

As best illustrated in FIGS. 1 through 6, the lug nut loosening assembly 10 generally comprises a coupler 12 that has a well 14 therein for insertably receiving a free end 16 of a lug wrench 18 when the lug wrench 18 has been positioned on a lug nut 20 of a wheel 22 on a vehicle 24. The vehicle 24 may be a passenger vehicle, a cargo vehicle or any other type of motorized vehicle. Additionally, the wheel 22 may be a vehicle wheel of any conventional design that employs lug nuts to attach to the vehicle 24. Also, the coupler 12 has an axle aperture 26 therethrough.

The coupler 12 comprises a block 28 that has a first lateral side 30, a second lateral side 32 and a bottom side 34, and the axle aperture 26 extends through the first lateral side 30 and the second lateral side 32. The block 28 is comprised of a rigid material, such as steel, iron or other similar material, to resist being deformed.

The coupler 12 includes a sleeve 36 that has a front end 38, a back end 40 and an outer surface 42 extending therebetween. The front end 38 is open thereby defining the well 14 in the sleeve 36 for receiving the free end 16 of the lug wrench 18 and the bottom side 34 of the block 28 is coupled to the outer surface 42 of the sleeve 36. The block 28 is oriented to extend along a line that is oriented parallel with an axis extending through the front end 38 and the back end 40 of the sleeve 36. The axle aperture 26 extends along an axis is oriented perpendicular to the axis extending through the front end 38 and the back end 40 of the sleeve 36. The sleeve 36 is comprised of a rigid material, such as steel, iron or other similar material, to resist being deformed.

An axle 44 is provided, the axle 44 is insertable through the axle aperture 26, and the axle 44 has a first end 46 and a second end 48. The axle 44 is elongated between the first end 46 and the second end 48 such that each of the first end 46 and the second end 48 is spaced outwardly from the outer surface 42 of the sleeve 36 when the axle 44 is inserted into the axle aperture 26. Additionally, the axle 44 may have a length ranging between approximately 5.0 inches and 10.0 inches.

A pair of wheels 50 is provided and each of the wheels 50 is positionable on the axle 44 when the axle 44 is inserted through the axle aperture 26. In this way each of the wheels 50 rests on a support surface upon which the vehicle 24 is parked. Moreover, each of the wheels 50 rolls along the support surface when the vehicle 24 is rolled rearwardly and when the lug wrench 18 is positioned on the lug nut 20 and is inserted into the sleeve 36. In this way the pair of wheels 50 transfers the rearward motion of the vehicle 24 into counter-clockwise rotation of the lug wrench 18 for breaking free the lug nut 20.

Each of the wheels 50 has a rolling surface 52, a first lateral surface 54 and a second lateral surface 56, and each of the wheels 50 has an axle hole 58 extending through the first lateral surface 54 and the second lateral surface 56. Each of the first end 46 and the second end 48 of the axle 44 is extendable through the axle hole 58 in a respective one of the wheels 50 thereby placing the lug wrench 18 in mechanical communication with the wheels 50. The rolling surface 52 of each of the wheels 50 is continuously arcuate about the axle hole 58 for rolling along the support surface.

In use, the lug wrench 18 is positioned around a lug nut 20 on the vehicle 24 wheel having the lug wrench 18 being generally directed toward a rear of the vehicle 24. The sleeve 36 is positioned onto the free end 16 of the lug wrench 18 and the axle 44 is extended through the axle aperture 26. Each of the wheels 50 is positioned on the axle 44 such that each of the wheels 50 rests on the support surface. The vehicle 24 is driven rearwardly thereby facilitating the lug wrench 18 to be rotated in a counterclockwise direction for loosening the lug nut 20. In this way the lug nut 20 can be loosened without power tools or without requiring a user to manipulate the lug wrench 18. Conversely, the lug wrench 18 can be positioned on the lug nut 20 having the lug wrench 18 being generally directed toward a front of the vehicle 24. In this way the vehicle 24 can be driven forwardly thereby facilitating the lug wrench 18 to be rotated in a clockwise direction for tightening the lug nut 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lug nut loosening assembly comprising:
   a coupler having a well therein for insertably receiving a free end of a lug wrench when the lug wrench has been positioned on a lug nut of a wheel on a vehicle, said coupler having an axle aperture therein;
   an axle being insertable through said axle aperture; and
   a pair of wheels, each of said wheels being positionable on said axle when said axle is inserted through said axle aperture wherein each of said wheels is configured to rest on a support surface upon which the vehicle is parked, each of said wheels rolling along the support surface when the vehicle is rolled rearwardly and when the lug wrench is positioned on the lug nut and is inserted into said sleeve wherein said pair of wheels is configured to transfer the rearward motion of the vehicle into counter-clockwise rotation of the lug wrench for breaking free the lug nut.

2. The assembly according to claim 1, wherein said coupler comprises a block having a first lateral side, a second lateral side and a bottom side, said axle aperture extending through said first lateral side and said second lateral side, said block being comprised of a rigid material wherein said block is configured to resist being deformed.

3. The assembly according to claim 2, wherein said coupler includes a sleeve having a front end, a back end and an outer surface extending therebetween, said front end being open thereby defining said well in said sleeve for receiving the free end of the lug wrench, said bottom side of said block being coupled to said outer surface of said sleeve, said sleeve being comprised of a rigid material wherein said sleeve is configured to resist being deformed.

4. The assembly according to claim 3, wherein said block is oriented to extend along a line being oriented parallel with an axis extending through said front end and said back end of said sleeve.

5. The assembly according to claim 3, wherein said axle aperture extends along an axis being oriented perpendicular to said axis extending through said front end and said back end of said sleeve.

6. The assembly according to claim 2, wherein said axle has a first end and a second end, said axle being elongated between said first end and said second end such that each of said first end and said second end is spaced outwardly from an outer surface of said sleeve when said axle is inserted into said axle aperture.

7. The assembly according to claim 6, wherein each of said wheels has a rolling surface, a first lateral surface and a second lateral surface, each of said wheels having an axle hole extending through said first lateral surface and said second lateral surface, each of said first end and said second end of said axle being extendable through said axle hole in a respective one of said wheels thereby placing the lug wrench in mechanical communication with said wheels, said rolling surface of each of said wheels being continuously arcuate about said axle hole wherein said rolling surface of each of said wheels is configured to roll along the support surface.

8. A lug nut loosening assembly comprising:
   a coupler having a well therein for insertably receiving a free end of a lug wrench when the lug wrench has been positioned on a lug nut of a wheel on a vehicle, said coupler having an axle aperture therein, said coupler comprising:
- a block having a first lateral side, a second lateral side and a bottom side, said axle aperture extending through said first lateral side and said second lateral side, said block being comprised of a rigid material wherein said block is configured to resist being deformed; and
- a sleeve having a front end, a back end and an outer surface extending therebetween, said front end being open thereby defining said well in said sleeve for receiving the free end of the lug wrench, said bottom side of said block being coupled to said outer surface of said sleeve, said block being oriented to extend along a line being oriented parallel with an axis extending through said front end and said back end of said sleeve, said axle aperture extending along an axis being oriented perpendicular to said axis extending through said front end and said back end of said sleeve, said sleeve being comprised of a rigid material wherein said sleeve is configured to resist being deformed;

an axle being insertable through said axle aperture, said axle having a first end and a second end, said axle being elongated between said first end and said second end such that each of said first end and said second end is spaced outwardly from said outer surface of said sleeve when said axle is inserted into said axle aperture; and a pair of wheels, each of said wheels being positionable on said axle when said axle is inserted through said axle aperture wherein each of said wheels is configured to rest on a support surface upon which the vehicle is parked, each of said wheels rolling along the support surface when the vehicle is rolled rearwardly and when the lug wrench is positioned on the lug nut and is inserted into said sleeve wherein said pair of wheels is configured to transfer the rearward motion of the vehicle into counter-clockwise rotation of the lug wrench for breaking free the lug nut, each of said wheels having a rolling surface, a first lateral surface and a second lateral surface, each of said wheels having an axle hole extending through said first lateral surface and said second lateral surface, each of said first end and said second end of said axle being extendable through said axle hole in a respective one of said wheels thereby placing the lug wrench in mechanical communication with said wheels, said rolling surface of each of said wheels being continuously arcuate about said axle hole wherein said rolling surface of each of said wheels is configured to roll along the support surface.

* * * * *